United States Patent
Colachis

(10) Patent No.: US 12,555,414 B2
(45) Date of Patent: Feb. 17, 2026

(54) NEUROMUSCULAR ELECTRICAL STIMULATION CONTROLLED BY COMPUTER VISION

(71) Applicant: Battelle Memorial Institute, Columbus, OH (US)

(72) Inventor: Samuel Colachis, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 646 days.

(21) Appl. No.: 17/882,013

(22) Filed: Aug. 5, 2022

(65) Prior Publication Data

US 2023/0068682 A1  Mar. 2, 2023

Related U.S. Application Data

(60) Provisional application No. 63/236,821, filed on Aug. 25, 2021.

(51) Int. Cl.
| | |
|---|---|
| G06K 9/00 | (2022.01) |
| A61F 2/48 | (2006.01) |
| G06F 3/01 | (2006.01) |
| G06V 10/20 | (2022.01) |
| G06V 20/40 | (2022.01) |
| G06V 40/20 | (2022.01) |

(52) U.S. Cl.
CPC ............ G06V 40/28 (2022.01); A61F 2/482 (2021.08); G06F 3/015 (2013.01); G06V 10/255 (2022.01); G06V 20/46 (2022.01)

(58) Field of Classification Search
None
See application file for complete search history.

(56) References Cited

U.S. PATENT DOCUMENTS

| | | | |
|---|---|---|---|
| 2005/0137648 | A1 | 6/2005 | Gregoire et al. |
| 2015/0066099 | A1 | 3/2015 | Kilgard et al. |
| 2016/0059412 | A1* | 3/2016 | Oleynik ............. B25J 19/02 |
| | | | 700/250 |
| 2017/0224985 | A1 | 8/2017 | Debur et al. |
| 2017/0325705 | A1 | 11/2017 | Ramos Murguialday et al. |
| 2018/0153430 | A1 | 6/2018 | Ang et al. |
| 2018/0154133 | A1 | 6/2018 | Bouton et al. |
| 2018/0239430 | A1 | 8/2018 | Tadi et al. |
| 2018/0280700 | A1 | 10/2018 | Wurth et al. |

(Continued)

OTHER PUBLICATIONS

International Search Report of Application No. PCT/US2022/039540 Dated Oct. 25, 2022.

(Continued)

Primary Examiner — Wei Wen Yang
(74) Attorney, Agent, or Firm — Lippes Mathias LLP

(57) ABSTRACT

An assistance method for assisting a person in grasping or otherwise manipulating an object includes receiving video of a hand of the person and of an object. An intent to grasp the object is identified based on proximity of the hand to the object in the video or as measured by a proximity sensor, or using gaze tracking, or based on measured neural activity of the person. The object and the hand in the video are analyzed to determine an object grasping action for grasping or otherwise manipulating the object. An actuator is controlled to cause the hand to perform the determined hand action for grasping or otherwise manipulating the object.

20 Claims, 4 Drawing Sheets

(56) References Cited

U.S. PATENT DOCUMENTS

| | | |
|---|---|---|
| 2019/0269343 A1 | 9/2019 | Ramos Murguialday et al. |
| 2020/0406035 A1 | 12/2020 | Sharma et al. |
| 2021/0027360 A1* | 1/2021 | Shmueli .................. G06F 1/163 |
| 2021/0038887 A1 | 2/2021 | Bouton et al. |
| 2021/0106487 A1 | 4/2021 | Bhugra et al. |
| 2021/0379372 A1* | 12/2021 | Friedenberg ........... A61B 5/397 |

OTHER PUBLICATIONS

M. Kutlu, et al, "Upper-limb stroke rehabilitation using electrods-array based functional electrical stimulation with sensing and control innovations" Medical Engineering and Physics vol. 38 pp. 366-379 (2016).

He, Kaiming, et al, "Mask R-CNN" Facebook AI Research (FAIR) pp. 1-12 Jan. 24, 2018.

* cited by examiner

NEUROMUSCULAR ELECTRICAL STIMULATION CONTROLLED BY COMPUTER VISION

This application claims the benefit of U.S. Provisional Application No. 63/236,821 filed Aug. 25, 2021 and titled "NEUROMUSCULAR ELECTRICAL STIMULATION CONTROLLED BY COMPUTER VISION", which is incorporated herein by reference in its entirety.

BACKGROUND

The following relates to the functional electrical stimulation (FES), to rehabilitation therapy arts, to activities of daily life (ADL) assistance arts, and to the like.

A functional electrical stimulation (FES) device typically include a sleeve or other garment that is worn by a user and includes surface electrodes contacting the skin of the wearer. In another approach, the FES device may comprise intramuscular electrodes implanted into the muscles. In either approach, a stimulation amplifier is built into or connected with the FES device to apply electrical stimulation to muscles of the arm, leg, or other anatomy on which the FES device is disposed to stimulate muscle contraction and consequent motion of an arm, leg, hand, or other body part. Use of surface electrodes, as opposed to intramuscular electrodes, is advantageously painless and non-invasive.

Bouton et al., U.S. Pub. No. 2018/0154133 A1 titled "Neural Sleeve for Neuromuscular Stimulation, Sensing and Recording", and Bouton et al., U.S. Pub. No. 2021/0038887 A1 titled "Systems and Methods for Neural Bridging of the Nervous System" provide illustrative examples of some illustrative sleeve designs suitable as FES devices, and illustrative applications for assisting patients with spinal cord injury, stroke, nerve damage, or the like. In some approaches there disclosed, a cortical implant receives neural signals from the brain which are decoded to detect an intended action which is then carried out by FES of the muscles of the anatomy (e.g. arm and/or hand).

Sharma et al., U.S. Pub. No. 2020/0406035 A1 titled "Control of Functional Electrical Stimulation using Motor Unit Action Potentials" discloses an approach in which surface electromyography (EMG) signals are measured using the FES device. Motor unit (MU) action potentials are extracted from the surface EMG signals and an intended movement is identified from the MU action potentials. FES is delivered which is effective to implement the intended movement. This approach is premised on the expectation that EMG signals will predominantly arise from the muscles that the patient intends to contract. For example, if the patient's volitional intent is to move the index finger, then the EMG signals should predominantly arise from the index finger, and not (for example) from the thumb. This reference also discloses an illustrative FES device in the form of a sleeve designed to be worn around the forearm of a user, with around 50-160 or more electrodes in some embodiments to provide high-density electromyography (HD-EMG).

Certain improvements are disclosed herein.

BRIEF SUMMARY

In accordance with some illustrative embodiments disclosed herein, an assistance system includes a video camera arranged to acquire video of a hand of a person and of an object, an actuator configured to be worn on the hand and/or on an arm to which the hand is attached, and an electronic processor that is programmed to: identify an intent to manipulate the object; determine a hand action for manipulating the object based on analysis of the video; and control the actuator to cause the hand to perform the determined hand action for manipulating the object.

In accordance with some illustrative embodiments disclosed herein, an assistance method includes: acquiring video of a hand of a person and of an object; identifying an intent to manipulate the object; determining a hand action for manipulating the object based on analysis of the object and the hand in the video performed by an electronic processor; and controlling an actuator using the electronic processor to cause the hand to perform the determined hand action for manipulating the object. The identifying of the intent to manipulate the object may be based on at least one of proximity of the hand to the object in the video, proximity of the hand to the object measured by a proximity sensor, a measured gaze of the person focusing on the object, and a measured neural activity of the person. The actuator may comprise (i) the hand comprising prosthetic hand worn on an arm of the person or (ii) an exoskeleton worn least on the hand and/or an arm of the person or (iii) a functional electrical stimulation (FES) device comprising a sleeve worn at least on the hand and/or an arm of the person and having surface electrodes arranged on an inner surface of the sleeve to electrically contact the hand and/or arm.

In accordance with some illustrative embodiments disclosed herein, a non-transitory storage medium stores instructions that are readable and executable by an electronic processor to perform an assistance method including: receiving video of a hand of a person and of an object; identifying an intent to grasp the object based on at least one of proximity of the hand to the object in the video, proximity of the hand to the object measured by a proximity sensor, a measured gaze of the person focusing on the object, and a measured neural activity of the person; analyzing the object and the hand in the video to determine an object grasping action for grasping the object; and controlling an actuator to cause the hand to perform the determined hand action for grasping the object.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

Figure 1:
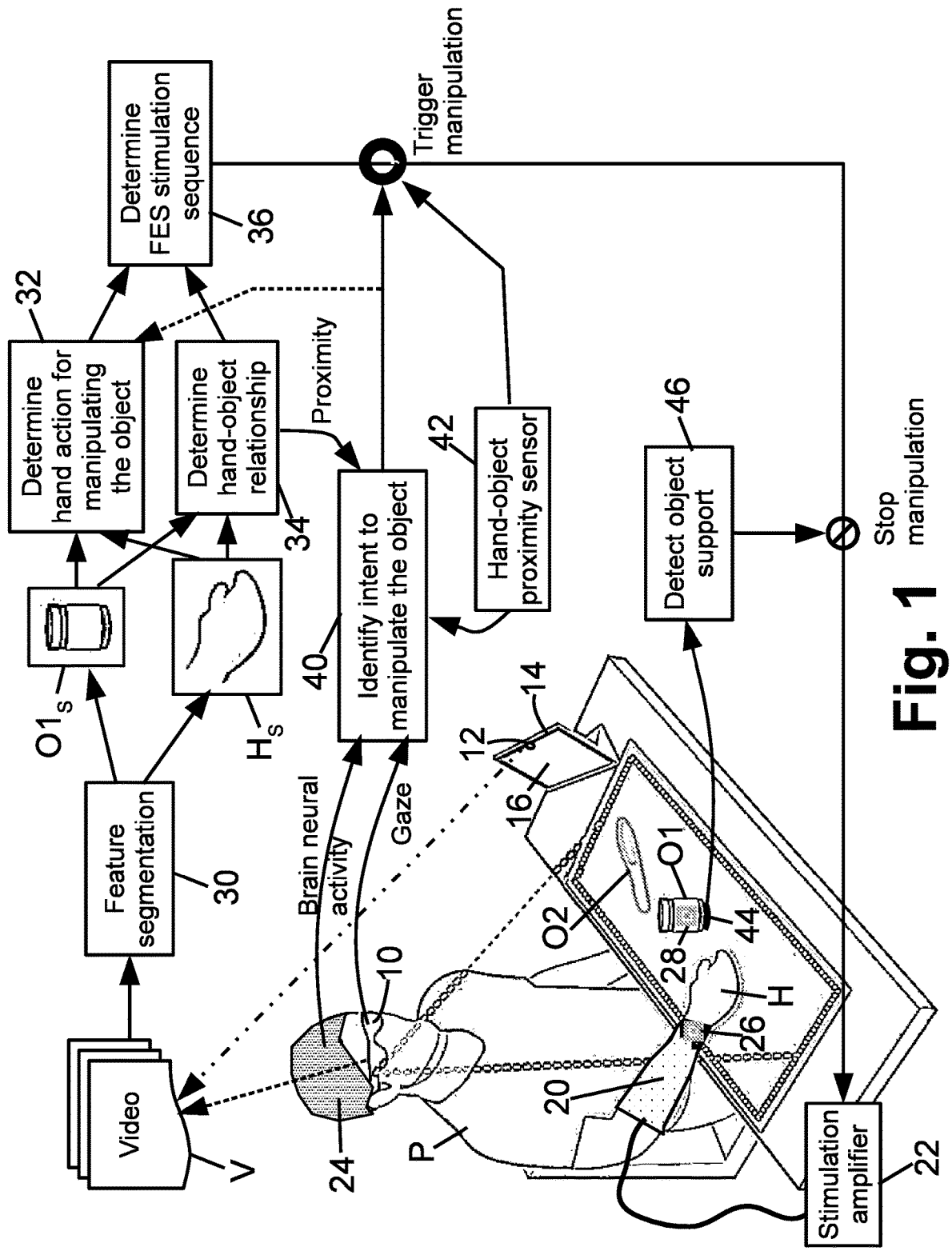
FIG. 1 diagrammatically shows an FES-based system configured to determine an intended action and to trigger FES actuation of the intended action.

Using a BCI to measure electrical activity in the motor cortex of the brain and decoding volitional intent to move a particular body part in a particular way from the brain neural activity is challenging due to the complexity of brain neural activity. There may be many neurological signals present at any given time, reflecting cognitive or other brain activities that may be unrelated to intent to move a specific body part. Moreover, measuring brain neural activity is difficult. In one approach, external surface electrode (e.g., electroencephalogram electrodes, i.e. EEG electrodes) may be used— however, reliable electrical contact may be impeded by the person's hair, and even if the person's hair is shaved off (which may be undesirable for various reasons) the electrical contact of the surface electrodes may be less than ideal. Surface electrodes are also prone to detecting brain activity in areas other than the specific point of electrode contact, due to the skin, skull, and other tissue interposed between the surface electrode and the brain. Implanted electrodes can provide better electrical contact and brain neural signal selectivity, but at the cost of an invasive procedure in which the electrodes are implanted. Beyond the difficulties in measuring the brain neural activity, decoding that activity to detect an intended volitional movement is challenging. Typically, machine learning (ML) algorithms are trained on brain neural data collected while the person is performing tasks (for example, asked to imagine gripping a coffee cup) and labeled with the known intent (in this example, the intent is known to be to grip the coffee cup). Due to the individualistic nature of brain neural activity, such ML algorithm training may need to be performed on an individual basis, that is, for each person individually, and may need to be rerun occasionally as the person's neural activity evolves over time.

Decoding EMG signals can be similarly challenging. Again, a choice is made between surface electrodes or implanted electrodes, with the former providing weaker EMG signal readings and the latter involving undesirable invasive implantation of needles or the like into the musculature. Decoding volitional intent from EMG signals may also be challenging, especially if the person is partially paralyzed and/or is suffering from a neuromuscular deficiency. In these cases, the EMG signals may be weak and/or may not accurately reflect the volitional intent of the person. For example, some stroke victims may have "cross-talk" such that efferent motor control signals from the brain are directed to incorrect muscle groups.

It is also recognized herein that determining volitional intent from brain or EMG signals is also more difficult as the specificity of the intent increases. For example, it may be relatively straightforward to decode that the person wants to do "something" with his or her hand, but significantly more difficult to decode more precisely what it is that the person wants to do. A particularly difficult problem is decoding intent to manipulate an object with the hand. Such manipulation may involve dozens or more muscles, as each finger has three joints and the thumb has two joints (for a total of 14 joints), with some joints being controlled by multiple muscle groups, and furthermore the object manipulation may involve action of arm and/or wrist muscles to control of the hand orientation to, for example, orient the hand with the palm of the hand facing the object.

In embodiments disclosed herein, these difficulties are alleviated by using computer vision to deduce the hand action for performing an intended manipulation of an object. This approach is based on the recognition that computer vision performed on video capturing the hand and the object can extract relevant information such as the shape and orientation of the object and the hand, and the spatial relationship between the hand and the object. Furthermore, the video can be used to trigger the hand action. This can be done in a smooth manner, for example, as the hand approaches the object as detected in the video, the wrist and/or arm muscles can be driven by functional electrical stimulation (FES) to orient the hand properly for grasping the object, and then as the hand comes into range of the object as again detected in the video the hand gripping action can be triggered to grasp the object. This sequence mimics a natural hand flow as controlled by hand-eye coordination in the case of a person with healthy eyesight and neuromuscular activity.

In some embodiments, this computer vision-based hand action determination is combined with a BCI, gaze monitoring, or another approach for determining the intent at a more general level. For example, if the person is staring at the object for a set time interval as detected by gaze tracking, then it may be inferred that the person volitionally intends to pick up the object. In another embodiment, a BCI may be similarly used to decode the general intent. The computer vision is then used in combination with the gaze tracking or BCI to determine the more specific action needed to grasp or otherwise manipulate the object.

By such approaches, a control system for upper limb reanimation in individuals with upper limb paralysis can be implemented, that uses object recognition glasses or video from another camera to control a high-definition functional electrical stimulation (FES) sleeve worn on the forearm that evokes functional hand movements. For example, objects the user intends to grab are detected by the object recognition glasses, this provides information to the FES garment regarding what type of grip is required, and a trigger sensor controlled by the user (EMG, EEG, eye-tracking, etc.) initiates and terminates that grip.

The actuator for performing the hand action can be various, e.g. an FES sleeve, a prosthetic hand, an exoskeleton, off-the-shelf electrical simulators, or so forth. Additionally, various trigger mechanisms or combinations of trigger mechanisms could be used, such as by way of non-limiting illustrative example: EMG (separate or integrated in the FES sleeve), EEG, eye-tracking (e.g., built into the same smart glasses also providing the video in some embodiments), and hand tracking using the smart glasses. In the latter embodiment, the smart glasses suitably use hand tracking to detect when the hand is placed on the object, and the actuator (e.g., FES sleeve, prosthetic hand, exoskeleton, et cetera) is then triggered to cause the hand to perform the gripping action. In another contemplated aspect, hand tracking is used to determine which object the hand is closest to, or is reaching toward, to determine which grip to enable. In another contemplated aspect, gaze tracking is used to determine which object the user intends to grip based on visual focus. In another variant embodiment, augmented-reality feedback could be integrated in the smart glasses to provide visual feedback regarding which objects are detected and which grips are cued.

As one nonlimiting illustrative application, many individuals suffer from upper limb paralysis due to spinal cord injury (SCI), stroke, and other neurological injuries, and are unable to move their hands (or a hand) to grip objects to perform activities of daily living (ADL). Various limb reanimation systems have been designed and developed for these individuals, but it is challenging to provide multiple hand functions non-invasively. Intracortical BCI devices can decode motor intention for many movements but entail invasive surgery to implant brain electrodes. Non-invasive solutions, including EEG or EMG, have difficulty decoding more than 1 or 2 movements reliably. Approaches disclosed herein by contrast enable many robust functional grips non-invasively with a reduced cognitive load on the user.

In one non-limiting illustrative embodiment, object detection via video is used as a control mechanism for FES (or a prosthetic hand, exoskeleton, or the like) and upper limb reanimation. Optionally, the video may be provided by object detection glasses paired with an FES sleeve. A control system may be provided, that uses object detection via the smart glasses to interactively determine which objects the person is reaching for and provides suitable hand grip by action of the FES sleeve to enable object gripping using EMG and/or other volitional triggers. In some aspects, video is used to detect when the controlled hand is on an object using object detection, and this information is used to drive FES. In some aspects, gaze tracking is paired with object detection to determine objects a person is visually focused on and use that information to drive FES.

Some non-limiting illustrative embodiments are described next.

In an embodiment, object detection glasses, comprising an integrated camera to capture live-stream video of the wearer's field of view, are worn by the user. Object detection operating by use of a convolutional neural network (CNN) framework or other machine learning (ML) component customized with transfer learning is applied to identify relevant objects (such as a mug, toothbrush, eating utensils, et cetera). Grabbable objects are detected in the user's field of view. The glasses may use a similar CNN framework or other ML to detect the user's hand location. An Electronic processor is programmed to detect when the user's hand is near a given object. For example, the object the hand is closest to may be assumed to be the target, and video of the hand and this closest object may be analyzed by computer vision techniques to determine what type of grip is required to grip the object. The electronic processor is further programmed to control, on the basis of this information, the FES sleeve worn on the person's forearm (and/or hand) to cue the necessary electrode activation pattern for evoking the target grip. In one approach, a database storing objects and associated grips is accessed to determine the grip. In another approach, object segmentation is used to determine the shape of the object and this information is used to determine the appropriate grip for that object shape.

In some embodiments, EMG sensors in the FES sleeve are used to initiate and terminate the FES to evoke movement based on the user's volition. Even in applications in which the person's limb is paralyzed, residual EMG at the highest dermatomes may still provide detectable EMG for use as the trigger. If the paralysis is such that the person has no detectable residual EMG usable as the trigger, suitable sensors can be placed at muscles innervated at higher dermatomes.

In some embodiments, EEG sensors integrated in the smart glasses could also be used as a means to trigger the movement.

These again are merely illustrative examples. In the following, some further illustrative embodiments are described with reference to the drawings.

With reference to FIG. 1, a person P receiving assistance from an illustrated assistance system wears smart glasses 10 having an eyeglasses form factor and that include a video camera for acquiring video V of an object (for example, a jar O1 or a knife O2) and a hand H. For example, the smart glasses 10 may be Google Glass™. Instead of using a camera of the smart glasses 10 to acquire the video V, a camera 12 of a computer 14 having a display 16 may be used to acquire the video V. For example, in an activity of daily life (ADL) training system, the computer 14 may provide instructions to the person P for performing the activity.

The patient P also has an actuator 20 configured to be worn on the hand and/or on an arm to which the hand H is attached. The illustrative actuator 20 is a functional electrical stimulation (FES) sleeve 20 configured to be worn on the hand H and/or an arm of the person P. The FES sleeve 20 has surface electrodes (not shown) arranged on an inner surface of the sleeve 20 to electrically contact the hand and/or arm when the sleeve is worn on the hand and/or the arm of the person P. A stimulation amplifier 22 is connected to apply functional electrical stimulation (FES) to muscles of the hand or arm via the surface electrodes of the FES sleeve 20 in order to stimulation muscle contractions and consequent movement of the fingers, thumb, or other hand movements. Various training approaches can be used to map surface electrodes to muscle groups or muscle units of the hand and/or arm in order to enable controlled stimulation of specific muscle groups or units to evoke specific movements. The FES sleeve 20 may, for example, bed designed to be worn around the forearm of the person P (possibly including the wrist, and possibly further extending to encompass a portion of the hand H), and may in some embodiments have around 50-160 or more electrodes to provide high-density stimulation (HD-FES), and optionally also high-density electromyography (HD-EMG).

In another embodiment, the actuator 20 may be an exoskeleton worn on the hand H and/or arm to which the hand H is attached. The exoskeleton (not shown) suitably includes rigid elements secured with joints of the fingers and thumb of the hand H, and optionally further includes rigid elements secured with the wrist and/or arm. The rigid elements are interconnected by motorized joints that are driven by electric servomotors or the like to drive movement of the hand H.

In yet another embodiment, the hand H is a prosthetic hand attached to the arm of the person P. In this embodiment, the actuator is the prosthetic hand (not shown). The biological hand of the person P in this embodiment has been amputated surgically or by another means, and has thus been replaced by a prosthetic hand which includes jointed prosthetic fingers and thumb that are driven by electric servomotors or the like of the prosthetic hand to mimic movements of a biological hand.

The patient P may have other optional monitoring devices, such as an illustrative optional skullcap 24 with surface electrodes (not shown) on its inner surface that contact the scalp of the patient P when worn. The surface electrodes of the skullcap 24 may serve as EEG electrodes for acquiring EEG signals, or may perform brain neural activity measurement that is input to a BCI (not shown). The smart glasses 10 may optionally include gaze trackers that, in conjunction with the video V acquired by the camera of the smart glasses 10, enables identification of an object that the eyes of the person P are focused on. For example, if the person looks intently at object O1 then the gaze tracking will measure the direction of the eyeballs and thus detect the point in space the gaze is focused at, and by mapping that to the video V the gaze can be identified as looking at the object O1.

Still further, the assistance system may include tracking tags, such as an illustrative radiofrequency identification (RFID) tag 26 attached to the FES sleeve 20 at its closest point to the hand H (thereby usable to track the location of the hand H), and an RFID tag 28 attached to the object O1. With this approach and with two, and more preferably at least three, RFID reader stations enabling triangulation of the signal from the RFID tags in space, the RFID tags 26, 28 can enable detection of the proximity of the hand H to the object O1 at any time.

An electronic processor is programmed by instructions stored on a non-transitory storage medium (components not shown) to perform the various data processing as described herein, such as: feature segmentation 30 to extract a segmented hand $H_s$ corresponding to the hand H and a segmented object O1s corresponding to the object O1 closest to the hand H; determination 32 based on the segmented object O1s (and optionally also the segmented hand $H_s$) of a hand action for manipulating the object (for example, using a lookup table of hand gripping actions for different types of objects); determination 34 based on the segmented hand $H_s$ and segmented object O1s of a hand-object spatial relationship (e.g. proximity of the hand H to the object O1, or a more detailed hand-object relationship indicating orientation of the hand H respective to the orientation of the object O1, or an even more complex hand-object spatial relationship such as indicating by vectors in three-dimensional space the location of the hand and object, et cetera); and determination 36 of an FES (or, more generally, actuator) stimulation sequence for implementing the determined hand action for manipulating the object. It will be appreciated that the processing 30, 32, 34, 36 to determine the stimulation sequence advantageously relies on the video V, and hence does not entail decoding detailed information on the intended finger, thumb, or other low-level movements from brain neural activity or EMG activity.

The electronic processor is further programmed by the instructions stored on the non-transitory storage medium to perform an operation 40 in which an intent to manipulate the object is determined. Various approaches can be used. In one approach, the gaze as determined by gaze trackers of the smart glasses 10 is used to identify the person P is staring at the object O1 for a predetermined time interval (e.g., 5 seconds, as a non-limiting example) and based on that steady gaze it is inferred that the person P wants to grasp and/or move the object O1. As another example, brain neural activity measured by the skullcap 24 is decoded by a BCI to determine the intent to manipulate the object. In another embodiment, proximity of the hand H to the object O1 is measured by a hand-object proximity sensor 42 (for example, RFID tag readers that read the RFID tags 26, 28 to determine the locations of the hand H and object O1 and the distance therebetween), or is determined from the hand-object relationship determined at processing operation 34. Advantageously, the determination of the intent to manipulate the object can be at a generalized level, and the operation 40 is not required to determine the detailed hand grip action that is intended—rather, that is determined by the computer vision processing 30, 32, 34 performed on the video V. Thus, for example, BCI determination of this general intent is more reliable than attempting detailed determination of the specific hand grip action that is intended.

The operation 40 may also operate in real-time to identify a trigger, that is, the moment (or time interval) in time that the person P intends to perform the hand grip action or other object manipulation action. For example, this trigger can be based on proximity of the hand H to the object O1 measured in real-time using the proximity sensor 42 or the hand-object relationship determined in real-time by iterative repetition of the operation 34 on successive frames of the video V. When the hand closes to within a predetermined distance of the object (which may be as small as zero in some specific examples) then the action is triggered, and the FES stimulation sequence determined in the operation 36 is executed by the stimulation amplifier 22 to cause the FES device 20 to stimulate muscles of the hand H to execute the hand grip action. (As another example, if the actuator is a prosthetic hand then when the action is triggered and the actuator stimulation sequence determined in the operation 36 is executed by the stimulation amplifier 22 to cause servomotors in the prosthetic hand to cause the prosthetic hand to execute the hand grip action). In some embodiments, a separate trigger is detected when the manipulation is to be stopped. For example, the object O1 may include a force sensor 44 on its bottom surface that detects when the object O1 is placed onto a table or other support surface, at which point the electronic processor monitoring the force sensor 44 detects 46 the object support and terminates the gripping action.

Figure 2:
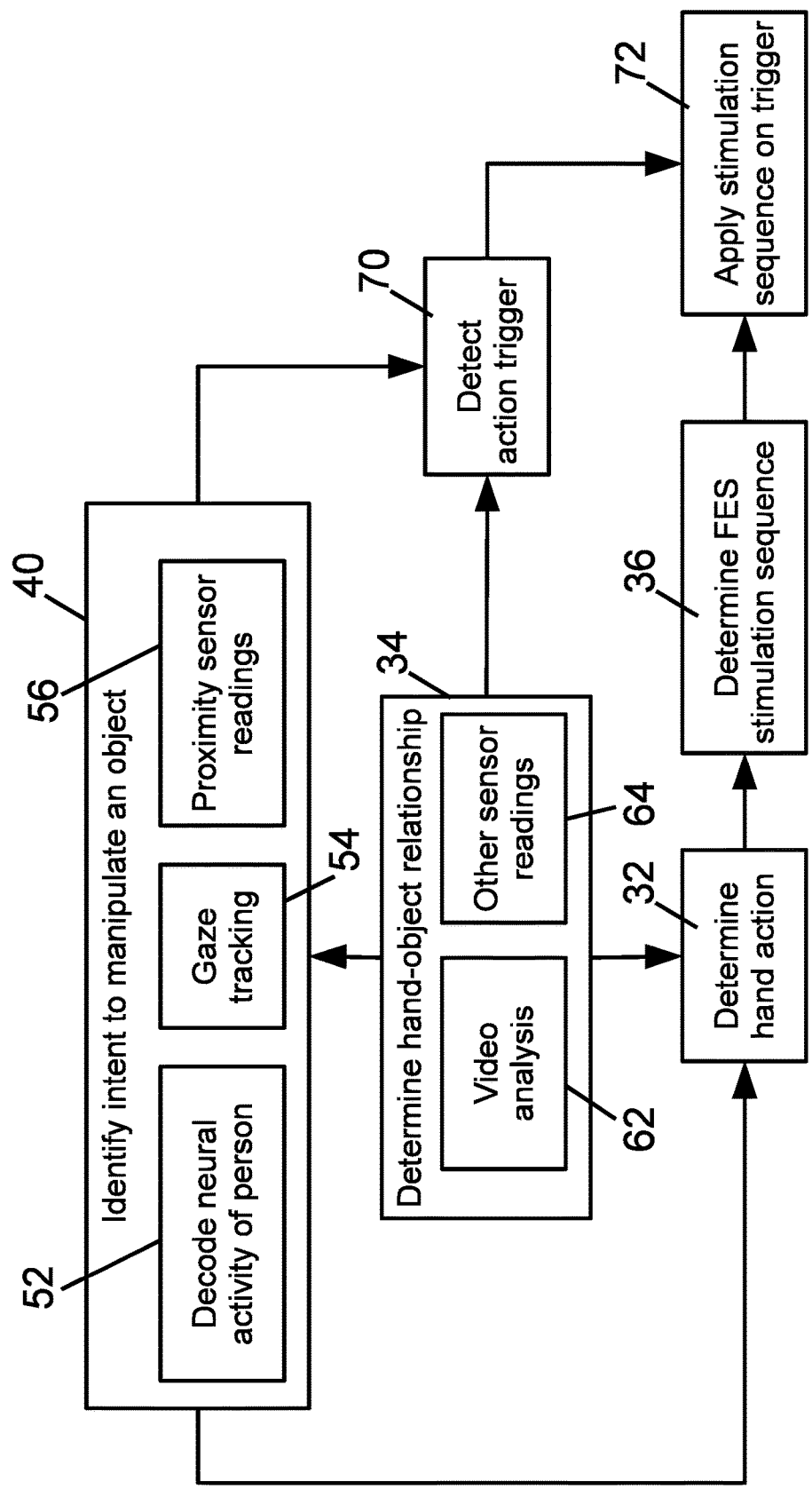
FIG. 2 diagrammatically shows a method suitably performed using the system of FIG. 1.

With reference now to FIG. 2, an assistance method suitably performed using the system of FIG. 1 is described. In the operation 40 also shown in FIG. 1, an intent to manipulate an object is identified. This may be done by various ways. In one illustrative approach 52, neural activity of the person measured by surface electrodes of the skullcap 24 (or, in another embodiment, measured using implanted electrodes) is decoded to identify the intent. For example, the operation 52 can employ a support vector machine (SVM) trained to receive brain neural activity and decode an intended action. See Bouton et al., U.S. Pub. No. 2021/0038887 A1 titled "Systems and Methods for Neural Bridging of the Nervous System" which is incorporated herein by reference in its entirety. Other types of machine learning (ML) can be employed for the decoding, such as deep neural network (DNN) decoders. As previously noted, when using the system of FIG. 1 which employs computer vision to determine the specific hand action for implementing the intended action, the intent decoding performed in the operation 52 advantageously need only identify the general intent of the person, rather than a detailed intent with respect to specific muscles of the hand.

Another illustrative approach for identifying the intent 40 employs gaze tracking 54 using eye trackers of the smart glasses 10 to identify the intent. For example, the eye trackers identify the person is focusing at a point in space, and maps this focus point to a location in the video V (in this case, preferably acquired by a video camera of the smart glasses 10 so that the video V is spatially registered with the gaze tracking). If the person focuses on a given object (e.g. the object O1) for a predetermined time interval (e.g., 5 seconds as a nonlimiting example) then an intent to manipulate that object is identified. Again, due to the use of computer vision to determine the detailed hand interaction, it is sufficient to identify the general intent to manipulate the object, which is feasibly achieved using gaze tracking 54.

Yet another illustrative example for identifying the intent 40 employs proximity sensor readings 56, such as those from the RFID tags 26, 28, to identify intent to manipulate an object. For example, consider a case in which the person P has volitional control of the upper arm muscles so that the person P can move the hand H toward the object O1. This could be the case, for example, if the person P has a prosthetic hand attached to an otherwise functional arm, or if the person has suffered a stroke or spinal cord injury which has left the hand H partially or entirely paralyzed, but in which the person P retains volitional control of the upper arm muscles. In such a case, the proximity sensors 26, 28 suitably detect when the person P moves the hand H toward the object O1 (for example), and infers intent to manipulate the object from that movement. The inference of intent can be based on a distance between the object O1 and the hand H becoming less than a predetermined threshold. Additionally or alternatively, the inference of intent can be based on the velocity of the hand H, e.g. a rapid movement of the hand H toward the object O1 can provide information from which the intent is inferred.

It is to be appreciated that the foregoing illustrative approaches can optionally be combined to infer the intent to manipulate the object. For example, a weighted combination of intent from neural activity decoding and gaze tracking can be combined, and the intent is identified only if both of these indicate the same intent to manipulate the same object. Moreover, additional or other information indicative of intent to manipulate an object can be used, such as EMG signals acquired using the electrodes of the FES sleeve 20, if the sleeve has EMG measurement capability.

With continuing reference to FIG. 2, at an operation 34 (also shown in FIG. 1) a hand-object relationship is determined. In some embodiments, the operation 34 is triggered by the operation 40, that is, once an intent to manipulate a specific object has been identified, then the operation 34 is performed to identify the hand-object relationship. Alternatively, for some tasks the operation 34 can be performed independently of the operation 40. For example, if the system of FIG. 1 is providing assistance for an activity of daily living (ADL) in which there is only a small, closed set of objects to be manipulated (e.g., in the case of making a peanut butter-and-jelly sandwich, this closed set may include bread, a jar of peanut butter, a jar of jelly, a knife for the peanut butter, a knife for the jelly, and a plate) then the operation 34 may be performed to track the hand-object relationship for each of these objects. It is also noted that both operations 40, 34 may be performed continuously (that is, iteratively repeated) in order to identify intent to manipulate an object in real time (so that, for example, if the person P moves the hand H toward the jar O1 and then moves it toward the knife O2 the change in intent is detected in near real-time) and in order to continuously monitor the hand-object relationship for each object of interest.

As shown in FIG. 2, the operation 34 of determining the hand-object relationship relies partially or entirely on video analysis 62. In one approach, object detection is performed on the video V, in the hand H and the object O1 of interest are delineated in a frame of the video V by a bounding box (BB). The location of the hand H or object O1 can then be designated as the center of the BB, and this may move as a function of time. For example, a convolutional neural network (CNN) may be trained to detect the hand H, and another CNN may be trained to detect each object O1, O2 of interest. In another approach, the operation 62 may identify the hand H and object O1 using instance segmentation, in which objects are delineated by pixel boundaries. Instance segmentation provides object orientation and high-detail resolution by detecting exact pixel-boundaries of the hand H and each object O1, O2 in frames of the video V. Various instance segmentation techniques can be employed, such as pixel classification followed by blob connectivity analysis, or instance segmentation using mask regional CNNs trained for specific object types (see He et al., "Mask R-CNN", arXiv:1703.06870v3 [cs.CV] 24 Jan. 2018). Other object identification techniques such as blob detection and template matching can be used to identify the hand H and each object O1, O2.

With the hand H and object O1 identified in frames of the video V, their spatial relationship can be estimated. In some embodiments, the spatial relationship includes distance between the hand H and object O1, and optionally also their locations in three-dimensional (3D) space. If the video V is 3D video, for example acquired using a range-finding camera or stereoscopic camera, then the spatial relationship can be estimated with high accuracy both in terms of distance between the hand and object and their locations in 3D space. If the video V is a 2D video then these values can only be estimated with reduced accuracy, e.g. based on distances in the 2D image but without information on the third dimension (depth). This can still be useful if the depth can be estimated in other ways—notably, most objects are manipulated with the arms extended with the elbows bent slightly, so that manipulated objects are at "arm's length". This distance is about the same for persons of widely ranging size, and can optionally be measured for the specific person P using the system of FIG. 1 if greater accuracy is desired. Additionally or alternatively, the spatial relationship may include orientational information, such as the orientation of the hand H and the orientation of the object O1. This can be done with either 2D or 3D video, for example by fitting the image of the object to an a priori known shape model for the object to determine its orientation in space. With the orientation information it can be determined, for example, whether the hand H needs to be turned to have its palm facing toward the object O1 to pick it up.

In some embodiments, the hand-object relationship is determined in the operation 34 entirely by video analysis 62, that is, by applying computer vision techniques to frames of the video V to extract the spatial relationship between the hand H and object O1 for example. In other embodiments, the computer vision analysis 62 is augmented by other sensor readings 64, such as hand and/or object orientation information provided by at least one inertial measurement unit (IMU) secured to the hand and/or object, such as an accelerometer, gyroscope, magnetometer, or combination thereof. In some embodiments, an IMU may be embedded into or attached on the FES sleeve 20 to provide information on hand orientation. It is also contemplated for the other sensor readings 64 to include information from bend sensors secured to fingers of the hand H or so forth.

The operations 50, 34 may be performed repeatedly, i.e. iteratively, to provide continuous updating of the intent and hand-object relationship. This information may be used by the system of FIG. 1 for various purposes. In an operation 32 (also shown in FIG. 1), a hand action is determined for performing the intended manipulation of the object identified in the operation 40. The operation 32 determines the appropriate hand action based on the hand-object relationship determined in the operation 34. Some common manipulations of an object include grasping the object, lifting the object, or moving the object. For any of these manipulations, the hand action includes an object grasping action for grasping the object. In one approach, the object grasping action is determined based on a shape of the object (e.g. jar O1) that is to be manipulated. This shape can be determined from the segmented object (e.g., O1s shown in FIG. 1). If the computer vision delineates a bounding box (BB) for the object, but not a detailed segmentation of the object, then a look-up table can be used to associate the object (for example, recognized using an image matching algorithm applied to the content of the BB) to an a priori known shape of the object. While grasping the object is a common manipulation, for which an object grasping action is an appropriate object interaction action, it is contemplated for the intended manipulation to be some other type of manipulation, such as pushing the object, and a corresponding object interaction action can be similarly determined for pushing the object or otherwise manipulating the object.

In addition to an object grasping action or other object interaction action, the overall hand action may further include a hand orientation action. For example, to grasp an object the palm of the hand must be facing the object prior to performing the object grasping action. Based on the relative orientation of the hand H and object O1 determined in the operation 34, an appropriate hand orientation action is also optionally determined. For example, the hand orientation action may suitably include rotating the hand at the wrist to rotate the palm into position facing the object. The hand action may also include other operations such as tilting the hand H up or down to align it with the object.

In an operation 36 (also shown in FIG. 1), a functional electrical stimulation (FES) stimulation sequence is determined for implementing the hand action determined at the operation 32. This is suitably based on a pre-calibration of the FES device 20, in which the FES stimulation sequence for producing specific hand movements is determined empirically and/or based on electrode-to-muscle mapping of the electrodes of the FES device 20 to the underlying musculature anatomy. In a typical empirical approach, applied stimulation patterns are varied until the resulting measured or recorded hand configuration matches a target hand configuration, and this is repeated for each type of hand action to be pre-calibrated.

In an operation 70, an action trigger is detected, and upon detection of the action trigger in an operation 72 the stimulation sequence determined at the operation 36 is applied. Various action trigger events or combinations of action trigger events can be used. In one example, the hand-object relationship determined at operation 34 is analyzed to determine when the distance of the hand H to the object O1 is within a predetermined threshold distance. This threshold might in some embodiments be zero, e.g. an object grasping action may be triggered when the video V indicates the hand has contacted the object (distance=0). Additionally or alternatively, EMG of the hand muscles measured using the FES sleeve 20 can be used to detect when the person P attempts to initiate muscle contractions for implementing the hand action. In yet another embodiment, if the person P has volitional control of a body part other than the body part undergoing rehabilitation, then the trigger event detected in operation 72 may be operation of a button, switch, or other manually-operable trigger control. For example, if the person P has the hand H (see FIG. 1) which is undergoing rehabilitation but the person's other hand is healthy, then the person P could hold a control button in the able hand to trigger the action to be performed by the disabled hand H. As another example, if the person's legs are under volitional control then a foot pedal could serve as the manually-operable trigger control.

Although not depicted in FIG. 2, various approaches can be used to terminate the action. In some embodiments, the action has an inherent defined termination point. For example, an action comprising picking up an object inherently terminates once the hand as grasped and lifted the object. On the other hand, some actions may employ a release trigger. For example, as previously noted the electronic processor may monitor the force sensor 44 to detect 46 the object support and terminate the gripping action. A proximity sensor can be similarly used if the action is to terminate when the hand (and/or an object gripped in the hand) reaches proximity to (or in some embodiments touches, i.e. proximity=0) a target location for releasing the object. In some embodiments, the release may also be triggered based on machine vision analysis, e.g. the analysis of the video V can detect when the hand and/or object are at the correct location and/or position for terminating the gripping action or other triggered action. As yet further variants, physiological neural signals could be used to trigger termination of the action. For example, in some further embodiments EMG or EEG are used to initiate and/or terminate the grip, while computer vision is used to generate the proper grip to use. In the case of EMG, a reduction or cessation of EMG signals associated with muscles that would (in the absence of disability) be performing the gripping action may be detected as the trigger for terminating the grip. In the case of EEG signals, a BCI interface suitably receives and decodes the EEG signals to detect an intent to release the grip.

Notably, the trigger signal for initiating the action and the trigger for terminating the action may be of the same kind or of different kinds. As one nonlimiting example of the latter case, a button, switch, or other manually-operable trigger control operated by an able hand or foot of the person P may be used to trigger initiation of the action (e.g. gripping an object) as previously described, while EMG or EEG may be used to trigger termination of the action (e.g. release the grip on the object).

Figure 3:
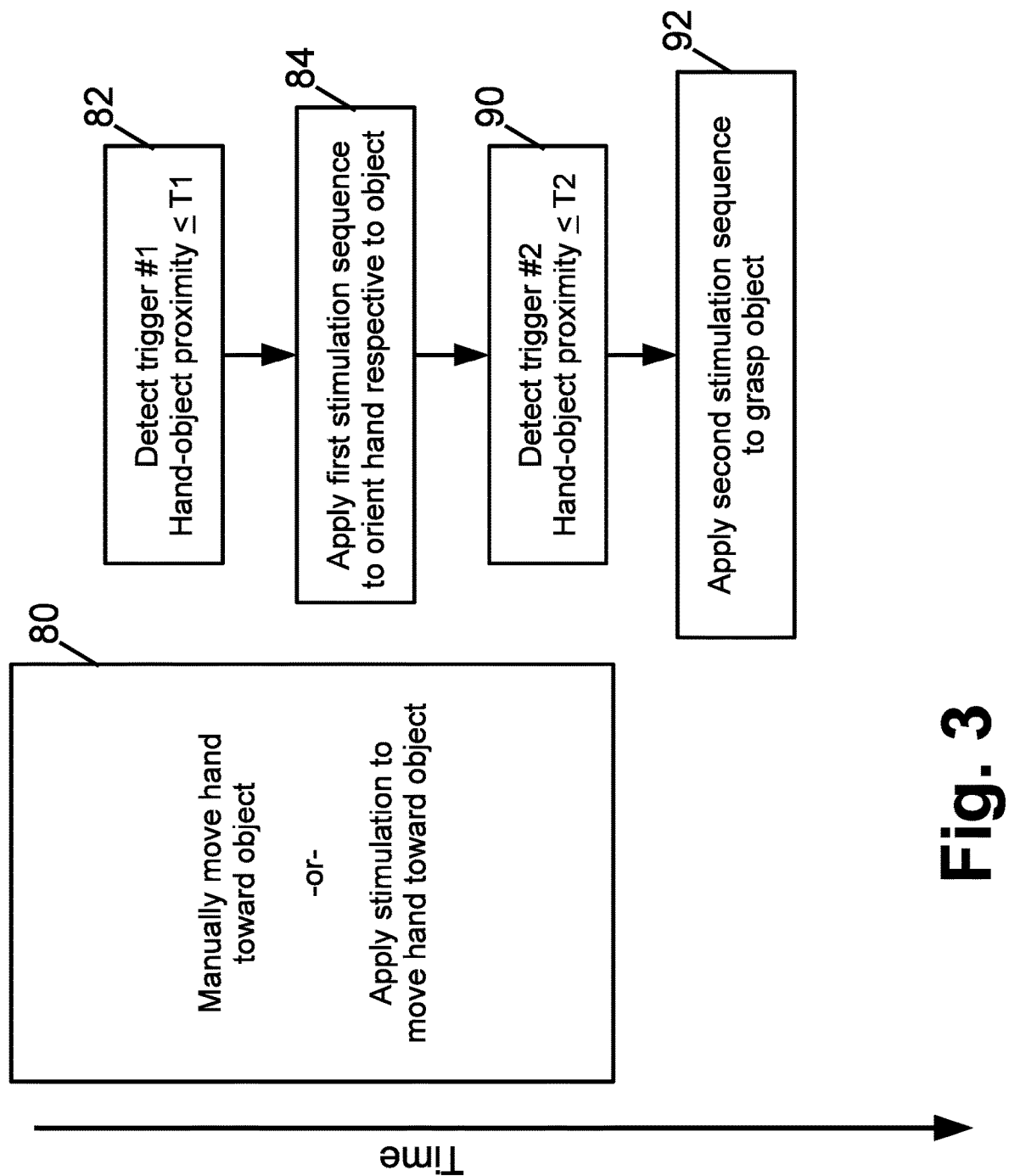
FIG. 3 diagrammatically shows an implementation of a two-step hand action using the system and method of FIGS. 1 and 2.

With reference to FIG. 3, in some embodiments and/or for some intended object manipulations, the hand action may include two or more steps that are performed in sequence. FIG. 3 illustrates an example in which the intended action is to grasp an object, but the hand also needs to be oriented properly so that its palm is facing the object (that is, a hand orientation action is to be performed) before performing the object grasping action. Furthermore, the example of FIG. 3, an operation 80 in which the hand is moved toward the object may optionally be a further hand action (or, more strictly speaking in this case, an arm action) performed under FES control (for this example the FES sleeve 20 of FIG. 1 would typically extend over the upper arm or even shoulder, to provide FES stimulation to the upper arm and optionally shoulder muscles to implement the movement of the hand toward the object. In other embodiments such as those in which only the hand is a prosthesis or in which the hand is (at least partially) paralyzed but the arm muscles remain under volitional control of the person P, the operation 80 is a manual operation in which the person P volitionally operates biological muscles of the upper arm and optionally shoulder to move the hand H toward the object O1.

In the example of FIG. 3, triggering of the steps of the hand action are performed based on monitoring of the hand-object proximity, e.g. using video analysis 62 and/or proximity sensor readings 56 as already described with reference to FIG. 2. In an operation 82, a first trigger (trigger #1) is detected in which the hand-object proximity is within a threshold T1. In an operation 84, a first stimulation sequence is applied to perform a hand orientation action in order to orient the hand with its palm facing the object. This occurs as the hand continues to move toward the object as per operation 80. As the hand continues to move toward the object, at an operation 90 a second trigger (trigger #2) is detected in which the hand-object proximity is within a threshold T2, where proximity threshold T2 is less than proximity threshold T1. In an operation 92, a second stimulation sequence is applied to perform an object grasping action in order to grasp the object O1 with the hand H. Advantageously, this approach enables a smooth movement of the hand H, in which it turns via the wrist to face the palm toward the object in response to the movement of the hand passing through threshold T1, followed by grasping the object when the hand reaches threshold T2 (which, again, may be zero in some embodiments). In the operation 90, another trigger could be used such as detecting EMG signals via the FES sleeve 20 (if the FES sleeve 20 has EMG detection capability) indicating that the person P is attempting to volitionally grasp the object.

Figure 4:
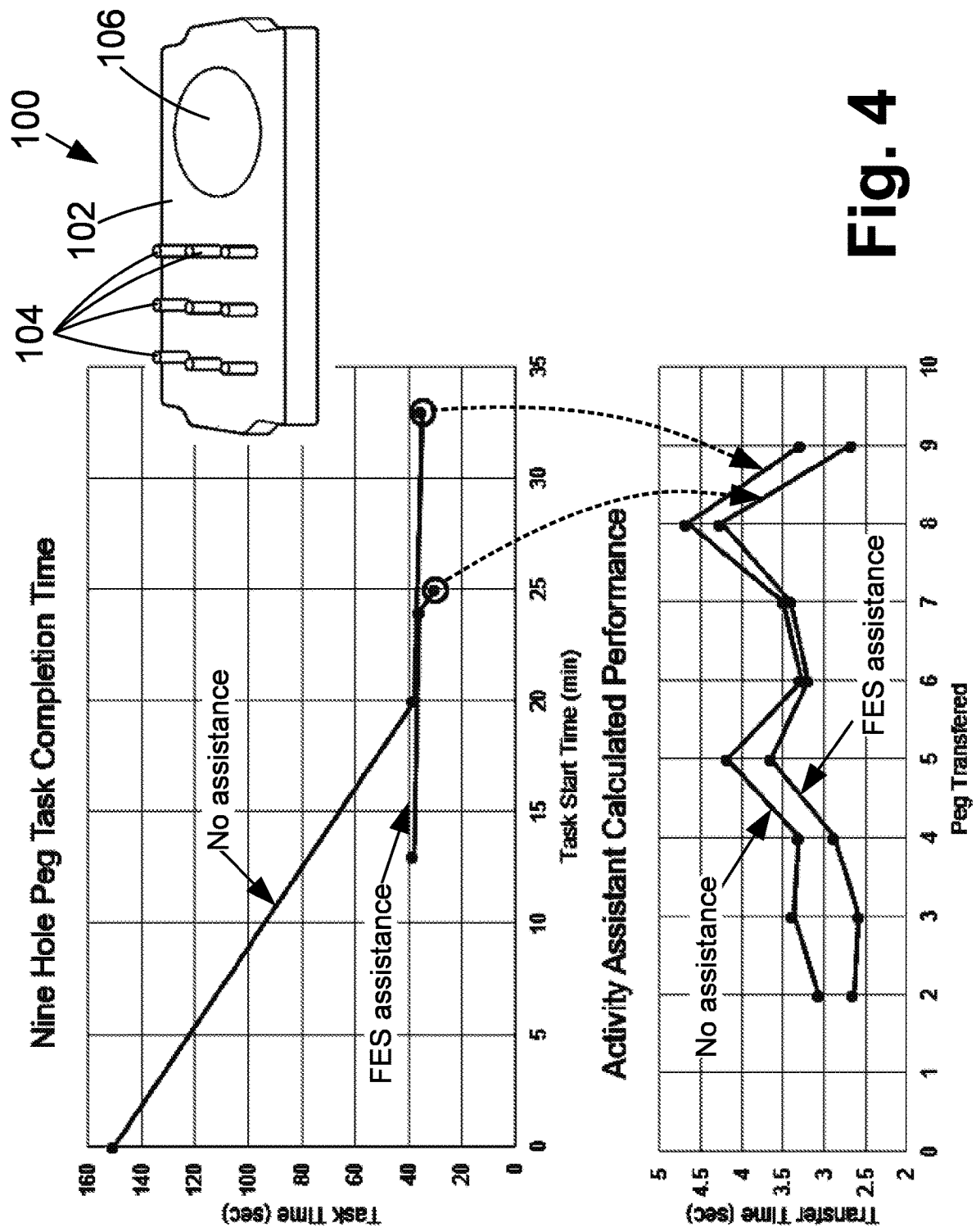
FIG. 4 presents an experimental test and results of that experimental test as described herein.

With reference to FIG. 4, an embodiment of the disclosed FES assistance was reduced to practice. The task to perform in this experiment was performed using an apparatus 100 comprising a board 102 with nine openings into which a corresponding nine pegs 104 were placed, and a target area 106. The task entailed the person picking up each peg and 104 moving it to the target area 106. The participant (i.e. person) in this experiment was recovering from a stroke. FIG. 4 further presents plots of the experimental results including a completion time versus task start time plot (top plot) and a plot of the transfer time for each peg (excluding the first peg). The "No assistance" data present the participant's performance with no FES assistance, while the "FES assistance" data present the participant's performance with FES assistance. The FES assistance in this experiment was as follows. Once the computer vision system detected a peg 104 had been picked up and move over or onto the target area 106, the FES sleeve 20 was energized to provide FES to cause the hand to release the peg 104. Such a release action is often challenging for individuals recovering from a stroke. Peg transfer times were calculated by the computer vision and used as indications of performance. FIG. 4 presents experimental task performance over a 35 minute session, with alternation between "No assistance" and "FES assistance". The "FES assistance" was an "all or nothing" assistance mode. In this mode, FES was not applied at all while the participant picked up a peg 104 and moved it over the target area 106; however, once the peg 104 was over the target area 106 as detected by the computer vision, FES assistance was provided via the FES sleeve 20 with a stimulation level sufficient to cause the hand to release the peg without any volitional release muscular stimulation needed from the participant. Interestingly, despite having only tried this once in the presented experimental results, there was a clear improvement in performance after using FES. The bottom graph of FIG. 4 in particular compares peg transfer times between the final two attempts circled in the top graph.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An rehabilitation assistance system comprising:
a video camera arranged to acquire video of a hand of a person and of an object;
a functional electrical stimulation (FES) device comprising a sleeve configured to be worn on the hand and/or on an arm to which the hand is attached and having surface electrodes arranged on an inner surface of the sleeve to electrically contact the hand and/or arm when the sleeve is worn on the hand and/or the arm of the person; and
an electronic processor programmed to:
identify an intent to manipulate the object;
determine a hand action for manipulating the object based on analysis of the video; and
control the FES device to cause the hand to perform the determined hand action for manipulating the object.

2. The rehabilitation assistance system of claim 1 wherein the identification of the intent to manipulate the object comprises identification of an intent to grasp and/or lift and/or move the object and the determination of the hand action comprises determining an object grasping action for grasping the object.

3. The rehabilitation assistance system of claim 2 wherein the electronic processor is programmed to determine the object grasping action for grasping the object by operations including:
identifying the object in the video; and
determining the object grasping action based on the identification of the object.

4. The rehabilitation assistance system of claim 2 wherein the electronic processor is programmed to determine the object grasping action for grasping the object by operations including:
segmenting the object in at least one frame of the video; and
determining the object grasping action based on a shape of the segmented object.

5. The rehabilitation assistance system of claim 1 wherein the electronic processor is further programmed to:
segment the object in at least one frame of the video;
segment the hand in the at least one frame of the video; and
determine a hand-object spatial relationship based on the segmented object and the segmented hand;
wherein the determination of the hand action for manipulating the object is based on the determined hand-object spatial relationship.

6. The rehabilitation assistance system of claim 1 wherein the identification of the intent to manipulate the object comprises an intent to move the object and the determination of the hand action comprises determining an object grasping action for grasping the object and the electronic processor is further programmed to:
control the FES device to cause the hand to release the object grasping action in response to analysis of the video indicating a completion of the movement of the object.

7. The rehabilitation assistance system of claim 1 further comprising:
a force sensor or proximity sensor disposed on a bottom of the object;
wherein the identification of the intent to manipulate the object comprises an intent to move the object and the determination of the hand action comprises determining an object grasping action for grasping the object and the electronic processor is further programmed to control the FES device to cause the hand to release the object grasping action in response to receiving a signal indicating a completion of the movement of the object from the force sensor or proximity sensor disposed on the bottom of the object.

8. The rehabilitation assistance system of claim 1 wherein the electronic processor is further programmed to:
detect an action trigger based on proximity of the hand to the object in the video or as measured by a proximity sensor attached to one or both of the hand and the object;
wherein the control of the FES device is performed in response to the proximity being closer than a threshold.

9. The rehabilitation assistance system of claim 1 wherein the determined hand action includes a hand orientation action and an object interaction action, and the electronic processor is further programmed to:

detect a first action trigger based on a first proximity of the hand to the object in the video or as measured by a proximity sensor attached to one or both of the hand and the object; and detect a second action trigger based on a second proximity of the hand to the object in the video or as measured by the proximity sensor attached to one or both of the hand and the object;

wherein the second proximity is closer than the first proximity; and wherein the control of the FES device includes controlling the FES device to cause the hand to perform the hand orientation action in response to the first action trigger and controlling the FES device to cause the hand to perform the object interaction action in response to the second action trigger.

10. The rehabilitation assistance system of claim 1 wherein the electronic processor is programmed to identify the intent to manipulate the object based on at least one of proximity of the hand to the object in the video, proximity of the hand to the object measured by a proximity sensor, a measured gaze of the person focusing on the object, and a measured neural activity of the person.

11. The rehabilitation assistance system of claim 1 wherein:

the electronic processor is programmed to identify the intent to manipulate the object including at least one of intent to grip the object and/or intent to release a grip on the object based on at least a measured neural activity of the person comprising brain activity measured by an electroencephalogram (EEG) or a brain-computer interface (BCI) and/or surface electromyography (EMG) measured by the FES device, the measured neural activity not being used to determine the hand action for manipulating the object.

12. The rehabilitation assistance system of claim 1 wherein:

the electronic processor is programmed to identify the intent to manipulate the object including at least one of intent to grip the object and/or intent to release a grip on the object based on surface electromyography (EMG) measured by the FES device.

13. The rehabilitation assistance system of claim 1 further comprising smart glasses, wherein the video camera is mounted on or in the smart glasses.

14. An assistance method comprising:

acquiring video of a hand of a person and of an object;

identifying an intent to manipulate the object based on at least one of proximity of the hand to the object in the video, proximity of the hand to the object measured by a proximity sensor, a measured gaze of the person focusing on the object, and a measured neural activity of the person;

determining, from a set of hand actions stored in a lookup table, a hand action for manipulating the object based on analysis of the object and the hand in the video performed by an electronic processor; and using the electronic processor, controlling a functional electrical stimulation (FES) device comprising a sleeve worn at least on the hand and/or an arm of the person and having surface electrodes arranged on an inner surface of the sleeve to electrically contact the hand and/or arm to cause the hand to perform the determined hand action for manipulating the object.

15. The activity assistance method of claim 14 wherein the identifying of the intent to manipulate the object comprises identifying an intent to grasp and/or lift and/or move the object and the determining of the hand action comprises determining an object grasping action for grasping the object.

16. The activity assistance method of claim 15 wherein the determining of the object grasping action for grasping the object includes one of:

identifying the object in the video and determining the object grasping action based on the identification of the object; or segmenting the object in at least one frame of the video and determining the object grasping action based on a shape of the segmented object; or segmenting the object in at least one frame of the video, segmenting the hand in the at least one frame of the video, and determining a hand-object spatial relationship based on the segmented object and the segmented hand, wherein the object grasping action for grasping the object is determined based on the hand-object spatial relationship.

17. The activity assistance method of claim 15 further comprising:

determining a proximity of the hand to the object in the video;

wherein the controlling of the FES device is performed in response to the proximity of the hand to the object in the video being closer than a threshold.

18. A non-transitory storage medium storing instructions that are readable and executable by an electronic processor to perform an assistance method including:

receiving video of a hand of a person and of an object;

identifying an intent to grasp the object based on at least one of proximity of the hand to the object in the video, proximity of the hand to the object measured by a proximity sensor, a measured gaze of the person focusing on the object, and a measured neural activity of the person;

analyzing the object and the hand in the video to determine an object grasping action for grasping the object from a set of object grasping actions stored in a lookup table; and controlling a functional electrical stimulation (FES) device comprising a sleeve worn at least on the hand and/or an arm of the person and having surface electrodes arranged on an inner surface of the sleeve to electrically contact the hand and/or arm to cause the hand to perform the determined hand action for grasping the object.

19. The non-transitory storage medium of claim 18 wherein the determined object grasping action for grasping the object includes a hand orientation action and a hand gripping action, and the controlling of the FES device includes:

controlling the FES device to perform the hand orientation action in response to proximity of the hand to the object in the video being less than a first threshold; and controlling the FES device to perform the hand gripping action in response to proximity of the hand to the object in the video being less than a second threshold that is less than the first threshold.

20. The non-transitory storage medium of claim 18 wherein:

the intent to grasp is identified based on at least a measured neural activity of the person; and the object grasping action for grasping the object is not determined based on the measured neural activity of the person.

* * * * *